US006421468B1

(12) United States Patent
Ratnakar et al.

(10) Patent No.: US 6,421,468 B1
(45) Date of Patent: Jul. 16, 2002

(54) METHOD AND APPARATUS FOR SHARPENING AN IMAGE BY SCALING ELEMENTS OF A FREQUENCY-DOMAIN REPRESENTATION

(75) Inventors: Viresh Ratnakar, Sunnyvale; Vasudev Bhaskaran, Mountain View, both of CA (US)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/226,370

(22) Filed: Jan. 6, 1999

(51) Int. Cl.$^7$ .............................................. H04N 7/12
(52) U.S. Cl. .................................... 382/254; 382/191
(58) Field of Search ........................... 382/254–255, 382/260–269, 190–191

(56) References Cited

U.S. PATENT DOCUMENTS

| | | | | |
|---|---|---|---|---|
| 5,038,388 A | * | 8/1991 | Song ............................ | 382/54 |
| 5,081,692 A | | 1/1992 | Kwon et al. ................... | 382/54 |
| 5,359,676 A | | 10/1994 | Fan .............................. | 382/56 |
| 5,363,209 A | | 11/1994 | Eschbach et al. ............ | 358/445 |
| 5,379,122 A | | 1/1995 | Eschbach ..................... | 358/426 |
| 5,422,675 A | * | 6/1995 | Lim ............................. | 348/420 |
| 5,515,112 A | * | 5/1996 | Penney ........................ | 348/630 |
| 5,524,162 A | | 6/1996 | Levien ......................... | 382/263 |
| 5,674,012 A | | 10/1997 | Sasaki ......................... | 400/61 |
| 5,696,842 A | | 12/1997 | Shirasawa et al. .......... | 382/176 |
| 5,703,965 A | | 12/1997 | Fu et al. ....................... | 382/232 |
| 5,757,977 A | | 5/1998 | Mancuso et al. ............ | 382/260 |
| 5,768,482 A | | 6/1998 | Winter et al. ................ | 395/109 |
| 5,774,599 A | * | 6/1998 | Muka et al. .................. | 382/254 |
| 5,790,205 A | | 8/1998 | Pettitt et al. ................. | 348/629 |
| 5,793,855 A | | 8/1998 | Kasson ........................ | 382/167 |

OTHER PUBLICATIONS

Devore, et al. "Image Compression Through Wavelet Transform Coding", IEEE Transactions On Information Theory, vol. 38, No. 2, pp. 719–746, Mar. 1992.
Said, et al. "A New, Fast, And Efficient Image Codec Based On Set Partitioning In Hierarchical Tress", IEEE Transactions On Circuits And Systems For Video Technology, vol. 6, No. 3, pp. 243–250, Jun.1996.
Shapiro, J.M. "Embedded Image Coding Using Zerotrees of Wavelet Coefficients", IEEE Transactions On Signal Processing, vol. 41, No. 12, pp. 3445–3462, Dec. 1993.
Villasenor, et al. "Wavelet Fileter Evaluation For Image Compression", IEEE Transactions On Image Processing, 2:1053–1060, Aug. 1995.

* cited by examiner

*Primary Examiner*—Thomas D. Lee
*Assistant Examiner*—Stephen Brinich
(74) *Attorney, Agent, or Firm*—Michael T. Gabrik (57) ABSTRACT

An original image is sharpened by obtaining a first frequency-domain representation of the original image, selecting one or more elements from this first representation based on one more criteria such as element magnitude and frequency, scaling the selected elements according to one or more scale factors, and forming a second frequency-domain representation by combining the scaled selected elements with the unselected elements of the first representation. A sharpened reproduction of the original image may be generated by applying an inverse transform to the second frequency-domain representation. A technique for deriving the value of the one or more scale factors is also discussed.

31 Claims, 8 Drawing Sheets

METHOD AND APPARATUS FOR SHARPENING AN IMAGE BY SCALING ELEMENTS OF A FREQUENCY-DOMAIN REPRESENTATION

CROSS-REFERENCE TO RELATED APPLICATION

This application is related to U.S. patent application Ser. No. 09/095,806 entitled "Two Row Buffer Image Compression (TROBIC)" and filed Jun. 10, 1998, the teachings of which are incorporated herein by reference.

TECHNICAL FIELD

The present invention is related generally to digital image processing, and is related more particularly to image processing that enhances the sharpness of edges in a reproduction of an original image while minimizing or avoiding the emphasis of noise.

BACKGROUND ART

There are many types of processing of digital information representing images that can be used to bring about desirable changes in image reproductions generated from that information. For example, information representing colors or intensities in an image can be modified to achieve more realistic colors in a reproduction, can augment this information with additional information to increase the resolution or the spatial density of the elements making up a reproduction, can enlarge or shrink the size of a reproduction, or can combine information representing multiple images to produce a single composite image. Another example of image processing, referred to as image compression, reduces the amount of information used to convey an image. By reducing the amount of this digital information, an image can be conveyed by limited bandwidth transmission channels in less time, can be conveyed in a given amount of time over a transmission channel of lower bandwidth, or can be stored on media having reduced storage capacity.

Image compression techniques may be divided into two groups. In one group, "lossless compression" methods like Huffman coding and run-length coding reduce the entropy of the image information in a manner that can be reversed to recover the original image perfectly. In a second group, "lossy compression" methods like quantization reduce the capacity requirements in a manner that does not permit perfect recovery of the original image. Lossy compression methods tend to blur images and introduce noise. Preferably, lossy compression methods are applied selectively so these artifacts are not perceptible, or at least not objectionable, in the recovered image.

With the exception of lossless compression, the advantages offered by these types of processing are offset by degradations in the quality of the reproduction such as noise or reduced spatial detail. Because noise typically has a high spatial-frequency, many known techniques for reducing noise are essentially low-pass filtering processes. Unfortunately, low-pass filtering tends to reduce spatial detail, which is typically manifested by blurring and softening of edges.

Techniques for enhancing spatial detail, sometimes referred to as "image sharpening," are essentially high-pass filtering processes. One well know method for image sharpening known as "unsharp masking" involves applying a low-pass spatial filter to an original image to obtain a blurred image with low spatial-detail. The difference between the blurred image and the original image, which is effectively a high-pass spatial filtered representation of the original image, is amplified by a scale factor and then added to the original image to obtain a sharpened image with emphasized high spatial-frequency components. Unfortunately, this process for image sharpening amplifies noise and sometimes sharpens edges or regions of an image that do not need sharpening. Furthermore, considerable memory is required to store the image so that the low-pass spatial filter can be applied with reasonable efficiency. Nevertheless, even with adequate memory, the filtering process is computationally intensive.

Several known techniques attempt to improve the basic unsharp masking technique by either improving the choice of scale factor used to amplify the blurred image, or by adapting the low-pass spatial filter used to obtain the blurred image. Unfortunately, these techniques do not reduce the filtering resources required to obtain the blurred image and, furthermore, require additional computational resources to compute scale factors or adapt filters.

In U.S. Pat. No. 5,038,388, incorporated herein by reference, a technique is described that attempts to optimize the amount of sharpening by computing a scale factor for each image element or "pixel" from a measure of pixel variances. The measure of pixel variances is obtained from two convolutional filter operations that are performed for each pixel. This technique requires additional resources to apply the convolutional filters.

In U.S. Pat. No. 5,363,209, incorporated herein by reference, a technique is described that adapts the frequency response of the spatial filter used to obtain the blurred image such that the maximum difference between nearby pixels is increased to a predetermined target value. This technique requires additional resources to determine local pixel differences and to adapt the spatial filter accordingly.

In U.S. Pat. No. 5,524,162, incorporated herein by reference, a technique is described that attempts to optimize the frequency response of a finite impulse response (FIR) spatial filter used to obtain the blurred image. This is accomplished by applying a Fast Fourier Transform (FFT) to the original image to determine the maximum spatial frequency $f_{MAX}$ in the image, and then calculating coefficients for the FIR spatial filter that increase the energy of the image components having a spatial frequency between 0.5 $f_{MAX}$ and $f_{MAX}$. This technique requires additional resources to apply the FFT.

In U.S. Pat. No. 5,703,965, incorporated herein by reference, a technique is described that attempts to improve image sharpening by identifying edges in an original image prior to image compression, and then passing control information with the compressed image that describes the identified edges. This technique requires additional processing resources to identify edges and it reduces the effectiveness of image compression by requiring additional information capacity to convey the control information with the compressed imaged.

In U.S. Pat. No. 5,757,977, incorporated herein by reference, a technique applies complex filters that operate with fuzzy logic to discern edges from noise. In this manner, sharpening can be applied only to image features deemed to be edges. This technique requires additional resources for the logic to discern edges.

What is needed is a computationally efficient technique that can sharpen an image with proper consideration for noise and for edges that are already sufficiently sharp.

DISCLOSURE OF INVENTION

It is an object of the present invention to provide for a technique that selectively improves the sharpness of a reproduced image that requires only modest computational and memory resources.

According to one aspect of the present invention, a method or apparatus enhances the reproduction of an image by receiving a first signal and obtaining therefrom a first frequency-domain representation of the image, selecting one or more elements of the first frequency-domain representation according to one or more criteria, scaling the selected elements by a scale factor, forming a second frequency-domain representation of the enhanced reproduction of the image by combining the scaled selected elements with elements of the first frequency-domain representation that are not selected, and generating a second signal conveying the second frequency-domain representation.

According to another aspect of the present invention, a system for generating an enhanced reproduction of an original image comprises an input device and an output device in which the input device has first processing circuitry coupled to an input apparatus and coupled to a first terminal, wherein the first processing circuitry receives from the input apparatus an image signal representing the original image, transforms the image signal into a first frequency-domain representation of the original image, and generates at the first terminal a first signal that conveys the first frequency-domain representation; and in which the output device has second processing circuitry coupled to the first terminal and coupled to an output apparatus, wherein the second processing circuitry receives the first signal from the first terminal, obtains therefrom the first frequency-domain representation, selects one or more elements in the first frequency-domain representation, forms a second frequency-domain representation of the original image by scaling the selected elements, transforms the second frequency-domain representation into a spatial-domain representation of the original image, and causes the output apparatus to present an enhanced reproduction of the original image in response to the spatial-domain representation.

The image enhancement technique of the present invention requires only very modest computational resources to select and scale frequency-domain elements, which are essentially negligible compared to the computational resources required to perform transforms and compression/decompression techniques.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Image Processing System

Overview

Figure 1:
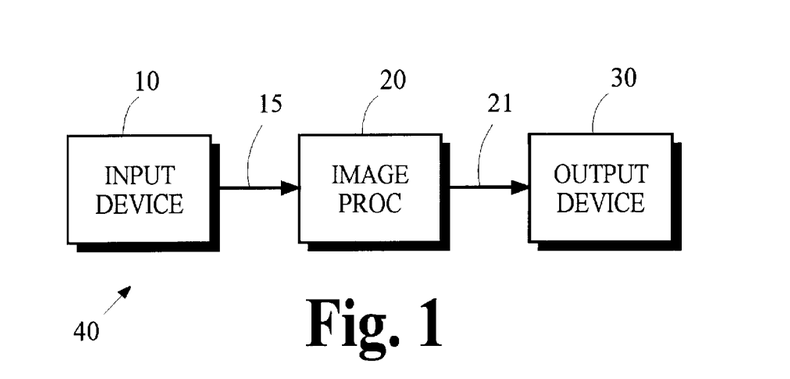
FIG. 1 is a block diagram of an image processing system.

FIG. 1 illustrates an image processing system in which input device 10 captures or generates an original image and passes information representing the original image along path 15 to processor 20. Processor 20 applies one or more processes to the information received from path 15 and may either transmit the processed information along path 21 or store the processed information for subsequent use. Output device 30 receives the processed information from path 21 and, in response, presents a reproduction of the original image.

Input Device

Input device 10 may be an optical scanner, camera, acoustic detector, infrared detector, X-ray detector or other device that is capable of sensing radiated energy representing an original image. Alternatively, input device 10 may be a device such as a computer graphics application that generates or synthesizes information representing an original image in response to commands or other information. No particular input device is important to practice the present invention.

Figure 3:
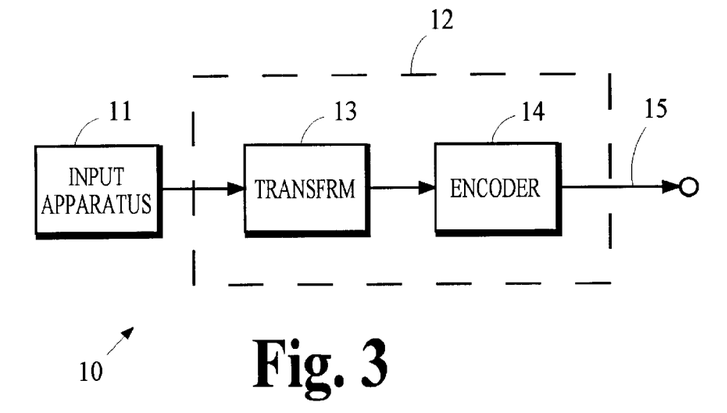
FIG. 3 is a block diagram of an input device that provides a compressed frequency-domain representation of an original image.

In one embodiment of input device 10 illustrated in FIG. 3, for example, input apparatus 11 such as a contact image sensor (CIS) detects an original image and passes signals representing the original image to processing circuitry 12 in which transform 13 generates a frequency-domain representation of the original image by applying a spatial-domain-to-frequency-domain transform to the signals received from input apparatus 11. Essentially any type of transform may be used including wavelet transforms, discrete cosine transforms (DCT), the discrete Fourier transform (DFT) or other orthogonal transforms. One wavelet transform that may be used is disclosed in U.S. patent application Ser. No. 09/095,806 entitled "Two Row Buffer Image Compression (TROBIC)" and filed Jun. 10, 1998. The result of the transform is passed to encoder 14, which generates along path 15 an encoded form of the frequency-domain representation. For example, encoder 14 may apply lossless and/or lossy compression techniques; however, compression and other forms of encoding are not essential to the present invention. Alternatively, some of all of this processing may be performed by hardware and/or software in processor 20.

Figure 5:
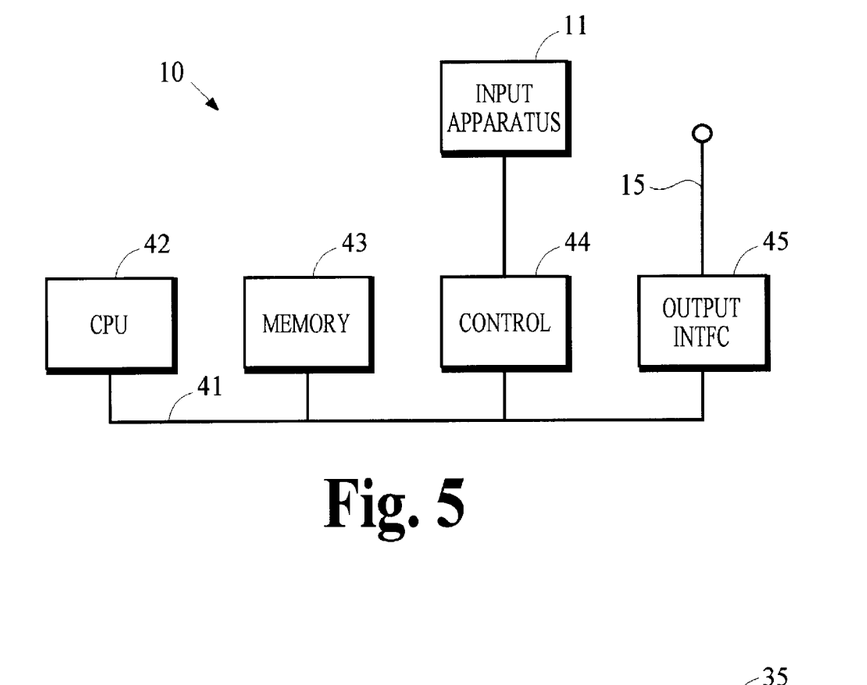
FIG. 5 is a block diagram of one embodiment of an input device that may be used in an image processing system that incorporates various aspects of the present invention.

FIG. 5 illustrates major components in one embodiment of input device 10 that can perform a wide range of image processing functions such as those just described. In this embodiment, control 44 represents an interface between input apparatus 11 and the remaining components. CPU 42 performs computations and directs input/output operations under the control of a program of instructions. Memory 43 represents any random access memory (RAM) and read only memory (ROM) that input device 10 uses. Output interface 45 represents an interface between input device 10 and path 15 along which information representing an original image is conveyed.

In alternative embodiments, image processing functions may be carried out in a wide range of implementations including discrete digital logic components, integrated circuits, one or more Application Specific Integrated Circuits (ASICs), gate arrays and the like. These implementations as well as program-controlled processors such as that mentioned above are referred to herein generally as "processing circuitry."

Image Processor

In some applications, the processing performed by processor 20 is intended to cause output device 30 to present an image that is as close to being an exact duplicate of the original image as possible. In other applications, the processing performed by processor 20 is intended to cause output device 30 to present an image that differs from the original image in some manner that is deemed to be an improvement.

Figure 2:
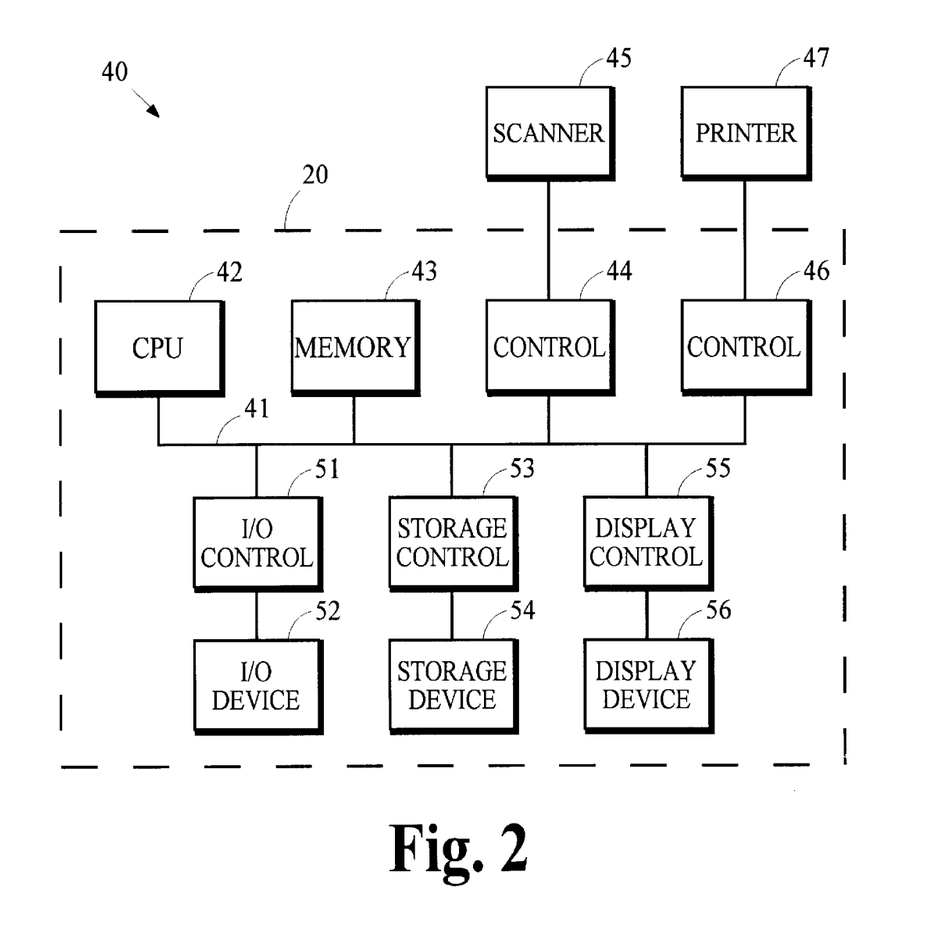
FIG. 2 is a block diagram of a computer system this is suitable for carrying out various aspects of the present invention.

Processor 20 may be implemented by software and/or hardware in a general-purpose computer such as personal computer system 40 illustrated in FIG. 2. CPU 42 performs computations and directs input/output operations under the control of a program of instructions. I/O control 51 represents an interface to I/O device 52 such as a keyboard, mouse or modem. Memory 43 represents any RAM and ROM that computer system 40 uses. Storage control 53 represents an interface to storage device 54 that includes a storage medium such as magnetic tape or disk, or an optical medium. The storage medium may be used to record programs of instructions for operating systems, utilities and applications, and may include embodiments of programs that implement various aspects of the present invention. Display control 55 provides an interface to display device 56. Control 44 represents an interface to scanner 45, which is an input device like an optical scanner. Control 46 represents an interface to printer 47, which is an output device like an ink jet color printer. Devices like scanner 45 may serve as input device 10 and devices like display device 56 or printer 47 may serve as output device 30.

In the embodiment shown, all major system components connect to bus 41, which may represent more than one physical bus. For example, some personal computers incorporate only a so called Industry Standard Architecture (ISA) bus. Other computers incorporate an ISA bus as well as a higher bandwidth bus conforming to some bus standard such as the VESA local bus standard or the PCI local bus standard. Preferably, display control 55 connects to a high-bandwidth bus to improve the speed of display. A bus architecture is not required to practice the present invention.

The functions of one or more computer components as well as various aspects of the present invention can be implemented in a wide variety of processing circuitry including discrete logic components, one or more ASICs and/or processors operating under control of a program of instructions embodied in ROM or copied into RAM from program storage. For example, processor 20 may also be implemented by hardware and software in a general-purpose computer or by a special-purpose device. Furthermore, not all of functions represented by the components illustrated in FIG. 2 are required. For example, I/O device 52, storage device 54 and display device 56 and the respective controllers may not be required for a processor that operates according to programmed instructions stored in memory 43 and does not interact with an operator.

The manner in which processor 20 is implemented is not important to the present invention. Other implementations including digital and analog processing circuitry may be used. Furthermore, some image processing functions may be performed by components within input device 10 and output device 30.

Output Device

Output device 30 may be essentially any type of printer, plotter or display such as a cathode ray tube (CRT), liquid crystal display (LCD) panel, or optical projector that can present a visual image by means of some media such as paper and ink or CRT phosphor. No particular output device is important to practice the present invention.

Figure 4A:
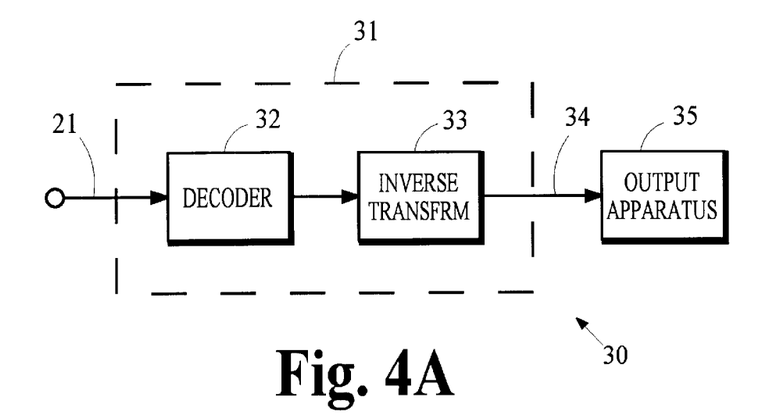
FIG. 4A is a block diagram of an output device that receives a compressed frequency-domain representation of an original image and, in response, provides a reproduction of the original image.

In one embodiment of output device 30 illustrated in FIG. 4A, for example, processing circuitry 31 receives from path 21 an encoded signal conveying a frequency-domain representation of an original image. Decoder 32 decodes the encoded signal and, if the frequency-domain representation is in a compressed form, applies decompression techniques as necessary. Decompression and other forms of decoding are not essential to the present invention but should be used as necessary to obtain the frequency-domain representation in an uncompressed, unencoded form. Inverse transform 33 generates a spatial-domain representation of the image by applying a frequency-domain-to-spatial-domain transform to the frequency-domain representation received from decoder 32. Essentially any type of inverse transform may be used including inverse wavelet transforms, inverse DCT, the inverse DFT or other inverse orthogonal transforms. The result of the inverse transform is passed along path 34 to output apparatus 35, which presents a reproduction of the image.

Alternatively, some of all of this processing may be performed by hardware and/or software in processor 20.

Figure 6:
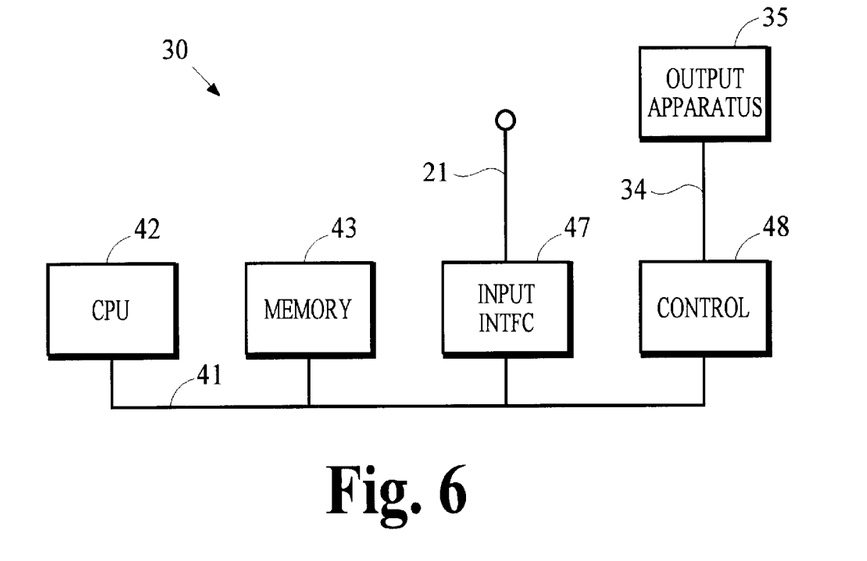
FIG. 6 is a block diagram of one embodiment of an output device that may be used in an image processing system that incorporates various aspects of the present invention.

FIG. 6 illustrates major components in one embodiment of output device 30 that can perform a wide range of image processing functions such as those just described. In this embodiment, input interface 47 represents an interface between output device 30 and path 21 from which encoded information representing an original image is received. CPU 42 performs computations and directs input/output operations under the control of a program of instructions. Memory 43 represents RAM and ROM that output device 30 uses. Control 48 represents an interface between output apparatus 35 and the remaining components. In alternative embodiments, the image processing functions may be carried out by a variety of processing circuitry implementations as mentioned above.

Image Sharpening

Overview

Figure 7:
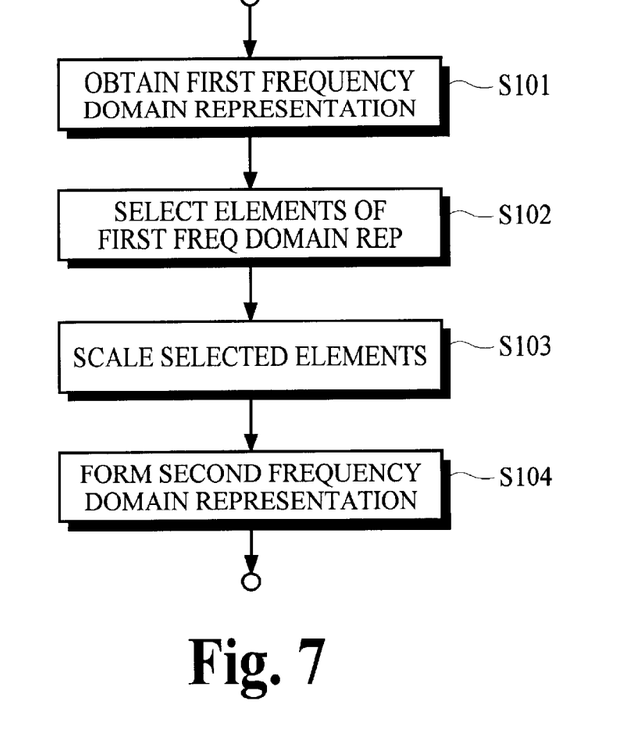
FIG. 7 is a flow diagram of steps in a method that may be used to carry out various aspects of the present invention.

FIG. 7 illustrates a flow diagram of steps in a method that may be used to carry out image sharpening according to various aspects of the present invention. This method may be performed according to a program of instructions in a computer system such as that illustrated in FIG. 2.

Step S101 obtains a first frequency-domain representation of an original image. This representation may be obtained by decoding encoded information, or deriving it from other information in any suitable manner.

Step S102 analyzes elements of the first frequency-domain representation and selects those elements in the representation that meet one or more criteria. In many embodiments, these elements are referred to as frequency-domain transform coefficients. The criteria that may be used to select an element includes element magnitude and the frequency represented by the element. If element magnitude is used, for example, this criteria may vary as a function of element frequency.

Step S103 scales the selected elements according to one or more scale factors. The scale factors may vary as a function of frequency.

Step S104 forms a second frequency-domain representation of an enhanced image by combining the scaled selected elements with the unselected elements of the first frequency-domain representation of the original image. The second frequency-domain representation may be passed immediately to an inverse transform or it may be stored for subsequent use.

Figure 4B:
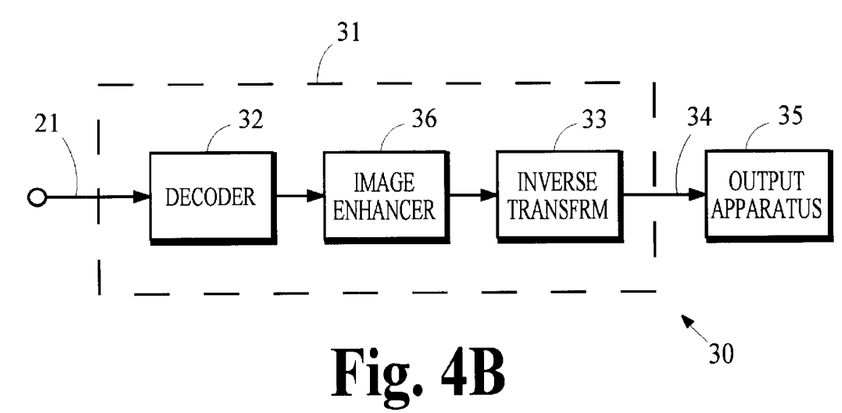
FIG. 4B is a block diagram of an output device that receives a compressed frequency-domain representation of an original image and, in response, provides an enhanced reproduction of the original image.

In one particular embodiment of an image processing system comprising input device 10 and output device 30 according to the embodiments shown in FIGS. 3 and 4B, respectively, input device 10 uses transform 13 to generate a frequency-domain representation and uses encoder 14 to apply lossless and lossy compression techniques to reduce the information capacity requirements of the representation. Output device 30 receives the compressed representation and uses decoder 32 to obtained an uncompressed first frequency-domain representation. Image enhancer 36 selects elements from the first frequency-domain representation and scales the selected elements to generate a second frequency-domain representation. Inverse transform 33 applies an inverse transform to the second frequency-domain representation to generate a spatial-domain representation of an enhanced image, and output apparatus 35 presents the enhanced image.

Image Enhancer

Figure 8:
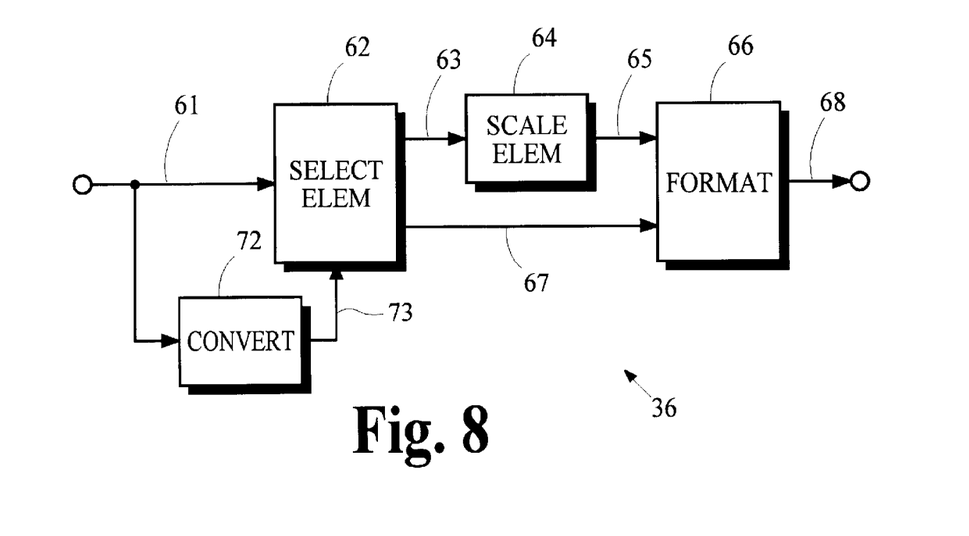
FIG. 8 is a block diagram of one embodiment of an apparatus that may be used to carry out various aspects of the present invention.

FIG. 8 is a block diagram of one embodiment of image enhancer 36 that may be used to implement the technique illustrated in FIG. 7 and described above. In this embodiment, select element 62 receives a first frequency-domain representation of an original image from path 61, selects one or more elements of the first frequency-domain representation according to one or more criteria, passes the selected elements along path 63 and passes the unselected elements along path 67. Scale element 64 receives the one or more selected elements from path 63, scales the selected elements according to one or more scale factors, and passes the scaled selected elements along path 65. Format 66 receives the scaled selected elements from path 65 and the unselected elements from path 67, and forms a second frequency-domain representation of an enhanced image by combining the scaled selected elements with the unselected elements of the first frequency-domain representation of the original image. The second frequency-domain representation is passed along path 68 for storage or for inverse transformation into a spatial domain.

Convert 72 is an optional component that converts the information conveyed by the first frequency-domain representation into a third frequency-domain representation that is better suited for analysis and element selection. For example, if the first frequency-domain representation conveys image color information expressed in a Red-Green-Blue (RGB) color space, it may be desirable to obtain a frequency-domain representation of this color information in an intensity-chrominance color space such as the $YC_rC_b$ color space. In this example, the intensity or luminance elements in the third frequency-domain representation are compared with the selection criteria. For each luminance element that meets the selection criteria, corresponding elements in the first frequency-domain representation are selected for scaling.

Image enhancer 36 may be implemented by components in output device 30, as shown in FIG. 4B. Alternatively, some or all of this processing may be implemented in processor 20.

EXAMPLE

Figure 11:
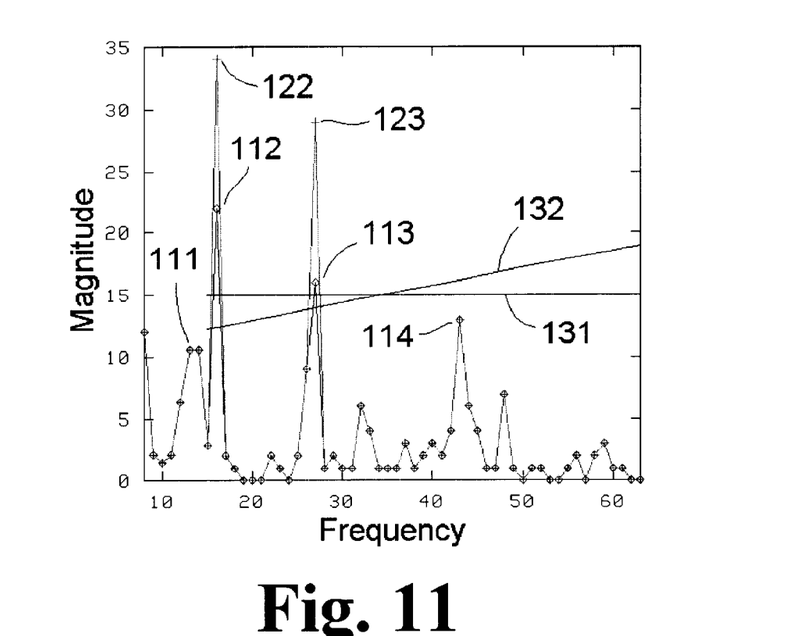
FIG. 11 is a graphical illustration of a frequency-domain representation of a region or block in an original image and a frequency-domain representation of the same region or block that is obtained by practicing various aspects of the present invention.

A specific example of image enhancement according to the present invention is illustrated in FIGS. 9 through 12. An original image is illustrated in FIG. 9. In FIG. 11 the magnitudes of the elements in a first frequency-domain representation for a small region or "block" of the original image are plotted as a function of spatial frequency. The size of the blocks is 32×2 pixels, which is chosen to impose only modest memory requirements and to balance computation complexity with overall image quality.

The points plotted in the figure represent elements E(i) that are obtained for this example by applying a pair of filters to a block of 32×2 pixels in the original image. The first filter $F_1$ is a Haar filter for subband decomposition. The second filter $F_2$ is a 2–6 wavelet transform that is described in J. Villasenor, et al., "Wavelet Filter Evaluation for Image Compression," *IEEE Trans. on Image Proc.*, August 1995, vol. 2, pp. 1053–1060, which is incorporated herein by reference. The overall effect of applying the two filters can be described in terms of operations that map a sequence of 2M pixels $(x_0, x_1, \ldots x_{2M-1})$ into a sequence of M low-pass coefficients $(y_0, y_1, \ldots y_{M-1})$ and a sequence of M high-pass coefficients $(z_0, z_1, \ldots z_{m-1})$.

The filtering effects of the Haar filter $F_1$ may be expressed as $$y_i = \frac{x_{2i}}{\sqrt{2}} + \frac{x_{2i+1}}{\sqrt{2}} \text{ for } i = 0, 1, \cdots M-1 \quad (1a)$$

$$z_i = \frac{x_{2i}}{\sqrt{2}} - \frac{x_{2i+1}}{\sqrt{2}} \text{ for } i = 0, 1, \cdots M-1 \quad (1b)$$

and the filtering effects of the 2–6 filter $F_2$ may be expressed as $$y_i = \frac{x_{2i}}{\sqrt{2}} + \frac{x_{2i+1}}{\sqrt{2}} \text{ for } i = 0, 1, \cdots M-1 \quad (2a)$$

$$z_i = \frac{x_{2i-2}}{8\sqrt{2}} - \frac{x_{2i-1}}{8\sqrt{2}} + \frac{x_{2i}}{\sqrt{2}} - \frac{x_{2i+1}}{\sqrt{2}} + \frac{x_{2i+2}}{8\sqrt{2}} + \frac{x_{2i+3}}{8\sqrt{2}} \quad (2b)$$
$$\text{for } i = 0, 1, \cdots M-1.$$

For a 32×2 block of pixels that comprises two horizontal rows of thirty-two pixels each or, stated differently, thirty-two columns of two pixels each, the two filters are applied as follows:

(1) apply filter $F_1$ vertically to pairs of pixels in each of the 32 columns in the block to obtain two rows of 32 coefficients $C_0$;

(2) apply filter $F_2$ horizontally to each row of coefficients from step (1) to obtain 16 low-pass coefficients $CL_0$ followed by 16 high-pass coefficients $CH_0$ for each row;

(3) apply filter $F_2$ to the 16 low-pass coefficients $CL_0$ in the first row to obtain 8 low-pass coefficients $CL_1$ followed by 8 high-pass coefficients $CH_1$;

(4) apply filter $F_2$ to the 8 low-pass coefficients $CL_1$ in the first row to obtain 4 low-pass coefficients $CL_2$ followed by 4 high-pass coefficients $CH_2$;

(5) apply filter $F_2$ to the 4 low-pass coefficients $CL_2$ in the first row to obtain 2 low-pass coefficients $CL_3$ followed by 2 high-pass coefficients $CH_3$; and (6) apply filter $F_1$ to the 2 low-pass elements $CL_3$ in the first row to obtain two coefficients $C_4$. The resulting 32×2 values are the frequency-domain elements $E(0)$ through $E(63)$, where the magnitude of $E(0)$ represents the spectral energy of the 32×2 block of pixels at frequency 0 and the magnitude of $E(63)$ represents the spectral energy of the block of pixels at frequency 63.

For filtering operations with filter $F_2$ the input sequence of 2M pixels $(x_0, x_1, \ldots x_{2M-1})$ is extended at each end by two values by setting $x_{-2}=x_1$, $x_{-c1}=x_0$, $x_{2M}=x_{2M-}$ and $x_{2M+1}=x_{2M-2}$.

In the graph shown in the figure, element magnitudes only for elements $E(8)$ through $E(63)$ are plotted. Elements $E(0)$ through $E(7)$, which have much greater magnitudes, are not included in the graph so that the higher-frequency elements may be plotted with more precision.

Referring to FIGS. 8 and 11, select element 62 analyzes the elements of the first frequency-domain representation representing a frequency higher than a frequency threshold, which in this example has the value 15, and selects those elements having a magnitude greater than threshold 131, which in this example has the value 15. Scale element 64 scales each selected element by a scale factor SF, which may vary as a function of frequency as shown by threshold 132. Format 66 combines the scaled selected elements and the unselected elements to form a second frequency-domain representation that may be expressed as:

$$D(i) = \begin{cases} E(i) \cdot SF(i) & \text{for } Thf < i < N \text{ and } |E(i)| > Thm \\ E(i) & \text{otherwise} \end{cases} \quad (3)$$

where
  $D(i)$=an element in the second frequency-domain representation;
  Thf=a frequency threshold, which in this example is 15;
  N=size of the transform, which in this example is 64;
  Thm=magnitude threshold, which in this example is 15; and
  $SF(i)$=scale factor that may vary as a function of frequency.

In the example shown in FIG. 11, only elements 112 and 113 are selected. Other elements such as 111 and 114 are not selected. Element 111 is not selected because it represents a frequency less than Thf and because it has a magnitude less than Thm. Element 114 is not selected even though it represents a frequency greater than Thf because it has a magnitude that is less than Thm. The two selected elements 112 and 113 are scaled to obtain scaled elements 122 and 123. The two scaled elements are combined with other unscaled element such as elements 111 and 114 to form the second frequency-domain representation. After repeating this process for each 32×2 block in the image, an enhanced image may be obtained by applying an inverse transform to the second frequency-domain representation for each block.

The image enhancement technique of the present invention requires only very modest additional computational resources because image sharpening only needs to select and scale frequency-domain elements. The scaling operation can be made especially efficient in many embodiments by restricting the values of the scale factors to powers of two, thereby allowing elements to be scaled by simple binary shift operations. The memory resources are also very modest because the image is processed one block or region at a time, which in this example is 64 pixels in a 32×2 block. A representation of the entire image need not be stored in memory at one time.

Figure 12:
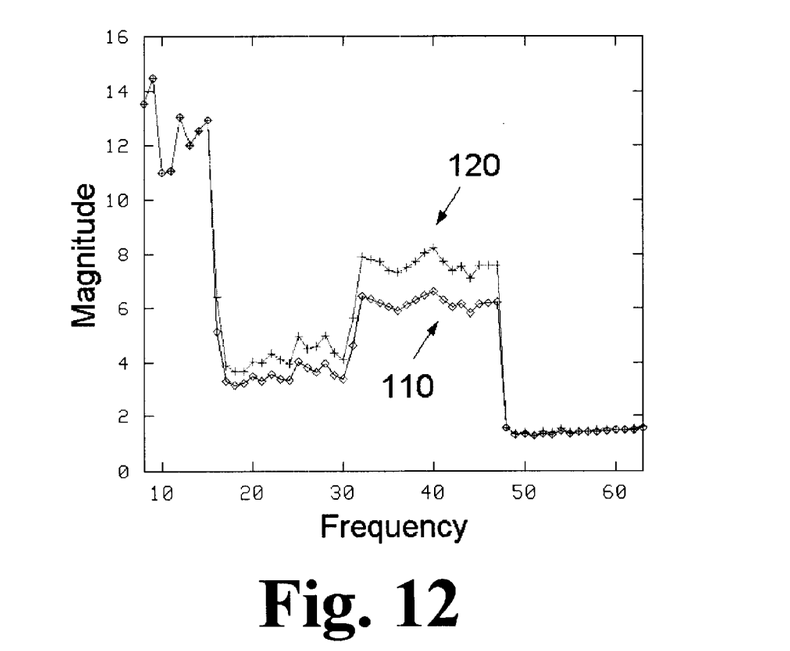
FIG. 12 is a graphical illustration of a frequency-domain representation of an original image and a frequency-domain representation of an enhanced image that is obtained by practicing various aspects of the present invention.

The overall frequency-domain effects of this technique is shown in FIG. 12. Points 110 represent the average value of the elements in the first frequency-domain representations for all blocks in the original image. Points 120 represent the average value of the elements in the second frequency-domain representations for all blocks in the enhanced image. A comparison of the two sets of average values shows that the overall effect of the image sharpening process changes the average value for some but not all of the high-frequency elements. In particular, the average value for the spatial frequencies corresponding to elements $E(48)$ and higher are not changed because the magnitudes of these elements in most if not all blocks is less than the magnitude threshold Thm. Because the magnitudes of these elements are low, they are presumed to represent noise and are not scaled.

The enhanced image may be obtained by inverse transformation of the second frequency-domain representation. The inverse transformation in this example is equivalent to applying a pair of synthesis or inverse filters to a block of 32×2 frequency-domain elements. The first synthesis filter $F_1^{-1}$ is a Haar synthesis filter and the second synthesis filter $F_2^{-1}$ is a 2–6 inverse wavelet transform. The overall effect of applying the two synthesis filters can be described in terms operations that map a sequence of M low-pass coefficients $(y_0, y_1, \ldots y_{M-1})$ and a sequence of M high-pass coefficients $(z_0, z_1, \ldots z_{M-1},)$ into a sequence of 2M pixels $(x_0, x_1, \ldots X_{2M-1})$.

The filtering effects of the Haar synthesis filter $F_1^{-1}$ may be expressed as $$x_{2i} = \frac{(y_i + z_i)}{\sqrt{2}} \text{ for } i = 0, 1, \cdots M-1 \quad (4a)$$

$$x_{2i+1} = \frac{(y_i - z_i)}{\sqrt{2}} \text{ for } i = 0, 1, \cdots M-1 \quad (4b)$$

and the filtering effects of the 2–6 synthesis filter $F_2^{-1}$ may be expressed as $$x_{2i} = \frac{y_{i-1}}{8\sqrt{2}} - \frac{y_{i+1}}{8\sqrt{2}} + \frac{y_i}{\sqrt{2}} + \frac{z_i}{\sqrt{2}} \text{ for } i = 0, 1, \cdots M-1 \quad (5a)$$

$$x_{2i+1} = -\frac{y_{i-1}}{8\sqrt{2}} + \frac{y_{i+1}}{8\sqrt{2}} + \frac{y_i}{\sqrt{2}} - \frac{z_i}{\sqrt{2}} \text{ for } i = 0, 1, \cdots M-1. \quad (5b)$$

For a 32×2 block of frequency-domain elements that comprises two horizontal rows of 32 elements each or, stated differently, thirty-two columns of two elements each, the two synthesis filters are applied as follows:

(1) apply synthesis filter $F_1^{-1}$ to the first two elements in the first row;

(2) apply synthesis filter $F_2^{-1}$ to the first 4 elements in the first row;

(3) apply synthesis filter $F_2^{-1}$ to the first 8 elements in the first row;

(4) apply synthesis filter $F_2^{-1}$ to the first 16 elements in the first row;

(5) apply synthesis filter $F_2^{-1}$ to all 32 elements in the first row and to all 32 elements in the second row; and (6) apply synthesis filter $F_1^{-1}$ to each of the 32 columns.

For filtering operations with filter $F_2^{-1}$ the sequence of M elements $(y_0, y_1, \ldots y_{M-1})$ is extended at each end by one value by setting $y_{-1}=y_0$ and $y_M=y_{M-1}$.

The calculations for the analysis and synthesis filters can be performed more efficiently by factoring out the square root of two in the filtering operations and scaling the results appropriately.

Figure 9A:
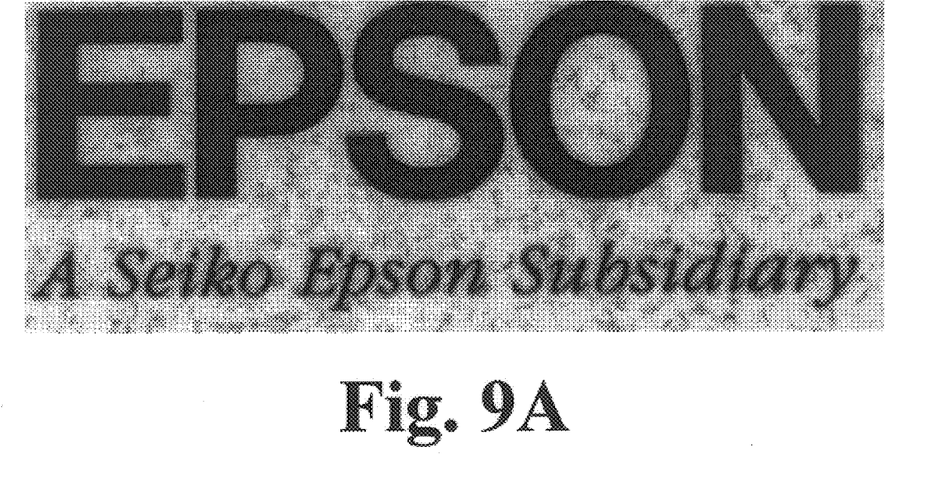
FIG. 9A is a pictorial representation of an original image.
Figure 9B:
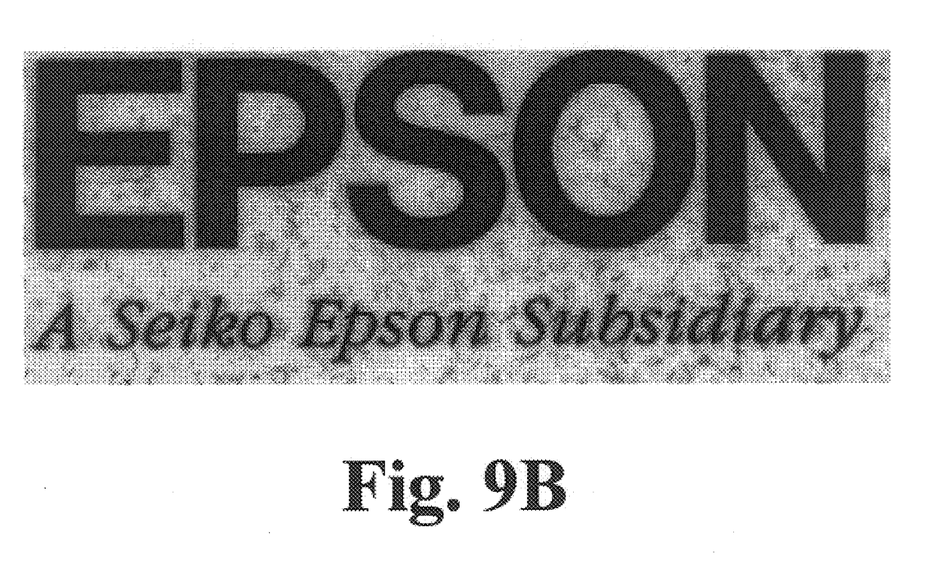
FIG. 9B is a pictorial representation of an enhanced image that is obtained by practicing various aspects of the present invention.
Figure 10A:
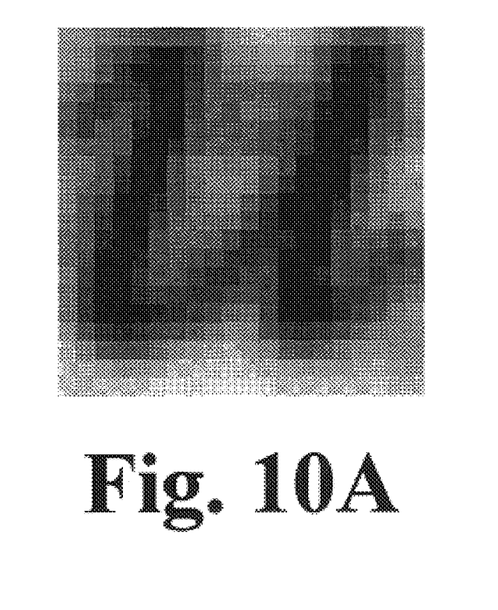
FIG. 10A is an enlarged representation of a small area in the original image.
Figure 10B:
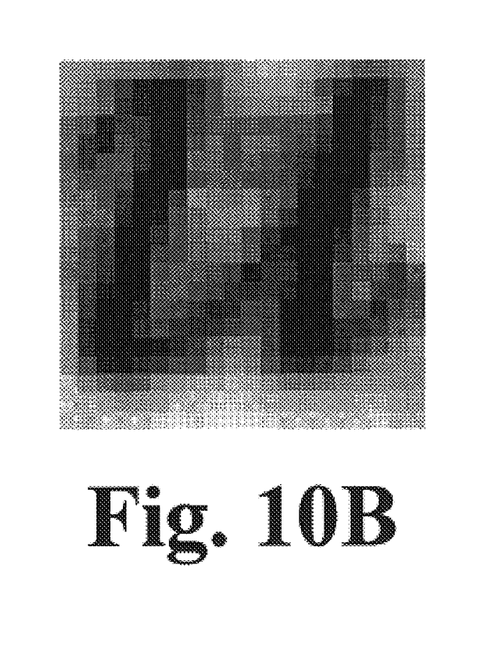
FIG. 10B is an enlarged representation of a small area in the enhanced image that is obtained by practicing various aspects of the present invention.

The enhanced image obtained by the inverse transformation of the second frequency-domain representation is shown in FIG. 9B. A comparison of this image with the original image illustrated in FIG. 9A shows a sharpening of edges. The sharpening effect on individual pixels may be seen by comparing an enlargement of a small area in the sharpened image shown in FIG. 10B with the corresponding enlarged area of the original image shown in FIG. 10A. As explained below, the scale factors in this example provide only a modest amount of image sharpening.

DERIVATION OF SCALE FACTORS

Figure 13:
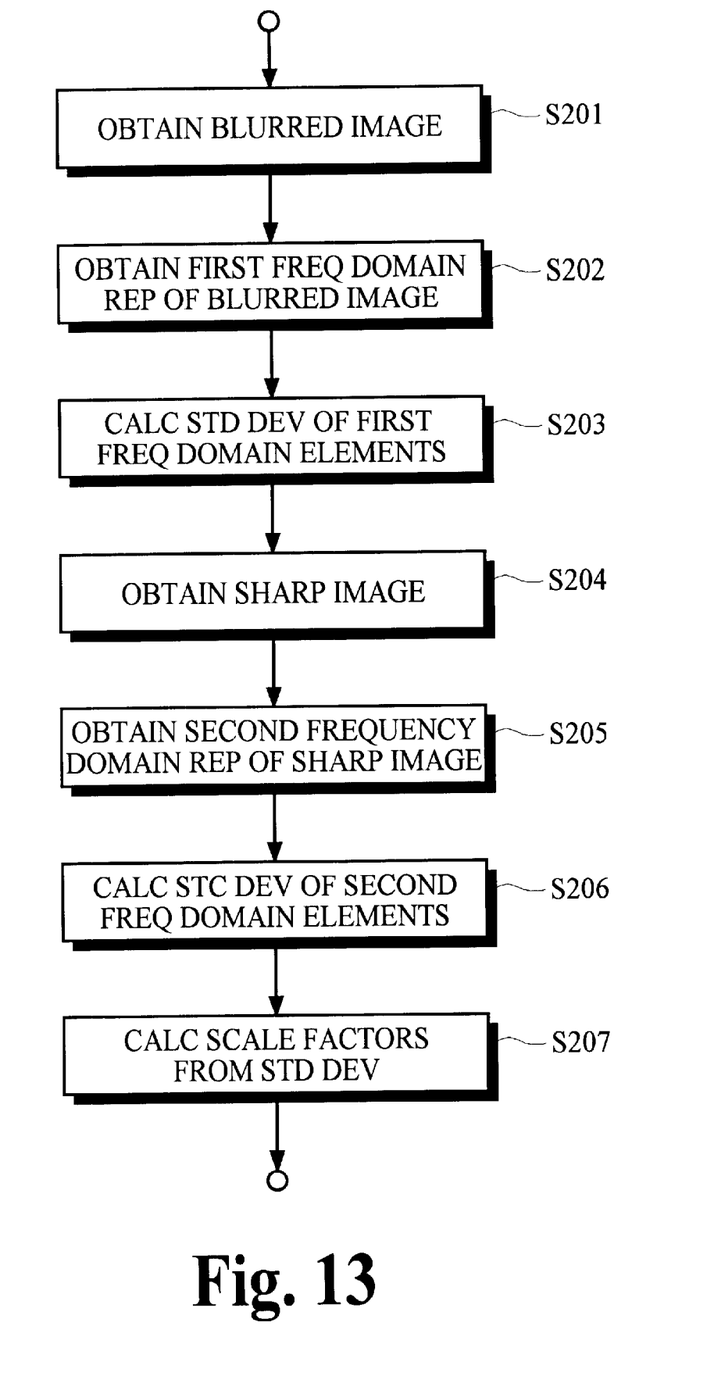
FIG. 13 is a flow diagram of steps in a method that may be used to derive scale factors for use in a method or apparatus for image sharpening according to the present invention.

FIG. 13 illustrates steps in a method that may be used for empirically deriving scale factors for an image processing system. This method may be performed according to a program of instructions in a computer system such as that illustrated in FIG. 2.

Step S201 obtains a blurred original image. This may be accomplished by applying a spatial low-pass filter to an original image, or the blurred image may be already available. Step S202 applies a transform to blocks of pixels in the blurred original image to form first frequency-domain representations. Step S203 calculates the standard deviation $\sigma_1$ for elements in the first frequency-domain representations.

Step S204 obtains a sharp original image. This may be accomplished by applying any known high-quality spatial-domain image enhancing technique to the blurred image, or the sharp original image may already be available (see step S201). Step S205 forms a second frequency–domain representation for the enhanced image. Step S206 calculates the standard deviation $\sigma_2$ for elements in the second frequency-domain representation. Step S207 calculates scale factors from pairs of standard deviations for respective elements in the two frequency-domain representations as follows:

$$SF(i) = \frac{\sigma_2(i)}{\sigma_1(i)} \quad (6)$$

where

SF(i)=scale factor for element E(i);

$\sigma_1(i)$=standard deviation of E(i) in first frequency-domain representation; and $\sigma_2(i)$=standard deviation of E(i) in second frequency-domain representation.

The scale factors derived in this manner provide a modest amount of scaling. The amount of image sharpening can be decreased or increased by decreasing or increasing the value of the scale factors, respectively.

What is claimed is:

1. A method for enhancing a reproduction of an image that comprises performing the acts of:

receiving a first signal and obtaining therefrom a first frequency-domain representation of the image;

selecting one or more, but less than all, elements of the first frequency-domain representation according to one or more criteria;

scaling the selected elements by a scale factor;

forming a second frequency-domain representation of the enhanced reproduction of the image by combining the scaled selected elements with elements of the first frequency-domain representation that are not selected; and generating a second signal conveying the second frequency-domain representation.

2. A method according to claim 1 that comprises applying an inverse orthogonal transform to the second signal to generate an output signal conveying the enhanced reproduction of the image in a spatial-domain.

3. A method according to claim 1 wherein the selected elements are scaled by a plurality of scale factors that vary as a function of frequency.

4. A method for enhancing a reproduction of an image that comprises performing the acts of:

receiving a first signal and obtaining therefrom a first frequency-domain representation of the image;

selecting one or more elements of the first frequency-domain representation according to one or more criteria;

scaling the selected elements by a scale factor;

forming a second frequency-domain representation of the enhanced reproduction of the image by combining the scaled selected elements with elements of the first frequency-domain representation that are not selected; and generating a second signal conveying the second frequency-domain representation;

wherein at least some elements of the first frequency-domain representation convey a measure of intensity and the selected elements correspond to frequencies of those elements that have an intensity greater than an intensity threshold.

5. A method according to claim 4 wherein the intensity threshold varies as a function of frequency.

6. A method for enhancing a reproduction of an image that comprises performing the acts of:

receiving a first signal and obtaining therefrom a first frequency-domain representation of the image;

selecting one or more elements of the first frequency-domain representation according to one or more criteria;

scaling the selected elements by a scale factor;

forming a second frequency-domain representation of the enhanced reproduction of the image by combining the scaled selected elements with elements of the first frequency-domain representation that are not selected; and generating a second signal conveying the second frequency-domain representation;

wherein the selected elements represent multiple colors in the image.

7. A method according to claim 6 that comprises deriving a third frequency-domain representation from the first signal, wherein the selected elements in the first frequency-domain representation correspond to elements in the third frequency-domain representation that have a value greater than a threshold.

8. A method according to claim 7 wherein the threshold varies as a function of frequency.

9. A method for enhancing a reproduction of an image that comprises performing the acts of:

receiving a first signal and obtaining therefrom a first frequency-domain representation of the image;

selecting one or more elements of the first frequency-domain representation according to one or more criteria;

scaling the selected elements by a scale factor;

forming a second frequency-domain representation of the enhanced reproduction of the image by combining the scaled selected elements with elements of the first frequency-domain representation that are not selected;

generating a second signal conveying the second frequency-domain representation; and applying an entropy decoder to the first signal to obtain the first frequency-domain representation, wherein the first signal conveys the image in a form having a lower entropy than the first frequency-domain representation that is obtained therefrom.

10. An apparatus for generating an output signal representing an enhanced image that comprises:

means for receiving a first signal and for obtaining therefrom a first frequency-domain representation of the image;

means for selecting one or more, but less than all, elements of the first frequency-domain representation according to one or more criteria;

means for scaling the selected elements by a scale factor;

means for forming a second frequency-domain representation of the enhanced reproduction of the image by combining the scaled selected elements with elements of the first frequency-domain representation that are not selected; and means for generating a second signal conveying the second frequency-domain representation.

11. An apparatus according to claim 10 that comprises means for applying am inverse orthogonal transform to the second signal to generate an output signal conveying the enhanced reproduction of the image in a spatial-domain.

12. An apparatus according to claim 10 wherein the selected elements are scaled by a plurality of scale factors that vary as a function of frequency.

13. An apparatus for generating an output signal representing an enhanced image that comprises:

means for receiving a first signal and for obtaining therefrom a first frequency-domain representation of the image;

means for selecting one or more elements of the first frequency-domain representation according to one or more criteria;

means for scaling the selected elements by a scale factor;

means for forming a second frequency-domain representation of the enhanced reproduction of the image by combining the scaled selected elements with elements of the first frequency-domain representation that are not selected; and means for generating a second signal conveying the second frequency-domain representation;

wherein at least some elements of the first frequency-domain representation convey a measure of intensity and the selected elements correspond to frequencies of those elements that have an intensity greater than an intensity threshold.

14. An apparatus according to claim 13 wherein the intensity threshold varies as a function of frequency.

15. An apparatus for generating an output signal representing an enhanced image that comprises:

means for receiving a first signal and for obtaining therefrom a first frequency-domain representation of the image;

means for selecting one or more elements of the first frequency-domain representation according to one or more criteria;

means for scaling the selected elements by a scale factor;

means for forming a second frequency-domain representation of the enhanced reproduction of the image by combining the scaled selected elements with elements of the first frequency-domain representation that are not selected; and means for generating a second signal conveying the second frequency-domain representation;

wherein the selected elements represent multiple colors in the image.

16. An apparatus according to claim 15 that comprises means for deriving a third frequency-domain representation from the first signal, wherein the selected elements in the first frequency-domain representation correspond to elements in the third frequency-domain representation that have a value greater than a threshold.

17. An apparatus according to claim 16 wherein the threshold varies as a function of frequency.

18. An apparatus for generating an output signal representing an enhanced image that comprises:

means for receiving a first signal and for obtaining therefrom a first frequency-domain representation of the image;

means for selecting one or more elements of the first frequency-domain representation according to one or more criteria;

means for scaling the selected elements by a scale factor;

means for forming a second frequency-domain representation of the enhanced reproduction of the image by combining the scaled selected elements with elements of the first frequency-domain representation that are not selected;

means for generating a second signal conveying the second frequency-domain representation; and means for applying an entropy decoder to the first signal to obtain the first frequency-domain representation, wherein the first signal conveys the image in a form having a lower entropy than the first frequency-domain representation that is obtained therefrom.

19. A medium readable by a device embodying a program of instructions for execution by said device to perform a method for generating an output signal representing an enhanced image, wherein the method comprises:

receiving a first signal and obtaining therefrom a first frequency-domain representation of the image;

selecting one or more, but less than all, elements of the first frequency-domain representation according to one or more criteria;

scaling the selected elements by a scale factor;

forming a second frequency-domain representation of the enhanced reproduction of the image by combining the scaled selected elements with elements of the first frequency-domain representation the are not selected; and generating a second signal conveying the second frequency-domain representation.

20. A medium according to claim 19 that comprises applying an inverse orthogonal transform to the second signal to generate an output signal conveying the enhanced reproduction of the image in a spatial-domain.

21. A medium according to claim 19 wherein the selected elements are scaled by a plurality of scale factors that vary as a function of frequency.

22. A medium readable by a device embodying a program of instructions for execution by said device to perform a method for generating an output signal representing an enhanced image, wherein the method comprises:

receiving a first signal and obtaining therefrom a first frequency-domain representation of the image;

selecting one or more elements of the first frequency-domain representation according to one or more criteria;

scaling the selected elements by a scale factor;

forming a second frequency-domain representation of the enhanced reproduction of the image by combining the scaled selected elements with elements of the first frequency-domain representation that are not selected; and generating a second signal conveying the second frequency-domain representation;

wherein at least some elements of the first frequency-domain representation convey a measure of intensity and the selected elements correspond to frequencies of those elements that have an intensity greater than an intensity threshold.

23. A medium according to claim 22 wherein the intensity threshold varies as a function of frequency.

24. A medium readable by a device embodying a program of instructions for execution by said device to perform a method for generating an output signal representing an enhanced image, wherein the method comprises:

receiving a first signal and obtaining therefrom a first frequency-domain representation of the image;

selecting one or more elements of the first frequency-domain representation according to one or more criteria;

scaling the selected elements by a scale factor;

forming a second frequency-domain representation of the enhanced reproduction of the image by combining the scaled selected elements with elements of the first frequency-domain representation that are not selected; and generating a second signal conveying the second frequency-domain representation;

wherein the selected elements represent multiple colors in the image.

25. A medium according to claim 24 that comprises deriving a third frequency-domain representation from the first signal, wherein the selected elements in the first frequency-domain representation correspond to elements in the third frequency-domain representation have a value greater than a threshold.

26. A medium according to claim 25 wherein the threshold varies as a function of frequency.

27. A medium readable by a device embodying a program of instructions for execution by said device to perform a method for generating an output signal representing an enhanced image, wherein the method comprises:

receiving a first signal and obtaining therefrom a first frequency-domain representation of the image;

selecting one or more elements of the first frequency-domain representation according to one or more criteria;

scaling the selected elements by a scale factor;

forming a second frequency-domain representation of the enhanced reproduction of the image by combining the scaled selected elements with elements of the first frequency-domain representation that are not selected;

generating a second signal conveying the second frequency-domain representation; and applying an entropy decoder to the first signal to obtain the first frequency-domain representation, wherein the first signal conveys the image in a form having a lower entropy than the first frequency-domain representation that is obtained therefrom.

28. A image processing system for generating an enhanced reproduction of an original image that comprises:

an input device comprising first processing circuitry coupled to an input apparatus and coupled to a first terminal, wherein the first processing circuitry receives from the input apparatus an image signal representing the original image, transforms the image signal into a first frequency-domain representation of the original image, and generates at the first terminal a first signal that conveys the first frequency-domain representation; and an output device comprising second processing circuitry coupled to the first terminal and coupled to an output apparatus, wherein the second processing circuitry receives the first signal from the first terminal, obtains therefrom the first frequency-domain representation, selects one or more, but less than all, elements in the first frequency-domain representation, forms a second frequency-domain representation of the original image by scaling the selected elements, transforms the second frequency-domain representation into a spatial-domain representation of the original image, and causes the output apparatus to present an enhanced reproduction of the original image in response to the spatial-domain representation.

29. An image processing system according to claim 28 wherein the second processing circuitry selects elements representing a frequency higher than a frequency threshold.

30. An image processing system for generating an enhanced reproduction of an original image that comprises:

an input device comprising first processing circuitry coupled to an input apparatus and coupled to a first terminal, wherein the first processing circuitry receives from the input apparatus an image signal representing the original image, transforms the image signal into a first frequency-domain representation of the original image, and generates at the first terminal a first signal that conveys the first frequency-domain representation; and an output device comprising second processing circuitry coupled to the first terminal and coupled to an output apparatus, wherein the second processing circuitry receives the first signal from the first terminal, obtains therefrom the first frequency-domain representation, selects one or more elements in the first frequency-domain representation, forms a second frequency-domain representation of the original image by scaling the selected elements, transforms the second frequency-domain representation into a spatial-domain representation of the original image, and causes the output apparatus to present an enhanced reproduction of the original image in response to the spatial-domain representation;

wherein the first processing circuitry reduces the information capacity requirements of the first signal and the second processing circuitry obtains the first frequency-domain representation by expanding the capacity requirements of information conveyed in the first signal.

31. An image processing system for generating an enhanced reproduction of an original image that comprises:

an input device comprising first processing circuitry coupled to an input apparatus and coupled to a first terminal, wherein the first processing circuitry receives from the input apparatus an image signal representing the original image, transforms the image signal into a first frequency-domain representation of the original image, and generates at the first terminal a first signal that conveys the first frequency-domain representation; and an output device comprising second processing circuitry coupled to the first terminal and coupled to an output apparatus, wherein the second processing circuitry receives the first signal from the first terminal, obtains therefrom the first frequency-domain representation, selects one or more elements in the first frequency-domain representation, forms a second frequency-domain representation of the original image by scaling the selected elements, transforms the second frequency-domain representation into a spatial-domain representation of the original image, and causes the output apparatus to present an enhanced reproduction of the original image in response to the spatial-domain representation;

wherein the second processing circuitry selects elements having a magnitude greater than a magnitude threshold.

* * * * *